Aug. 27, 1946.    F. PETROVIC    2,406,437
CHOCOLATE DIPPED PEANUT ATTACHMENT
Filed June 10, 1942
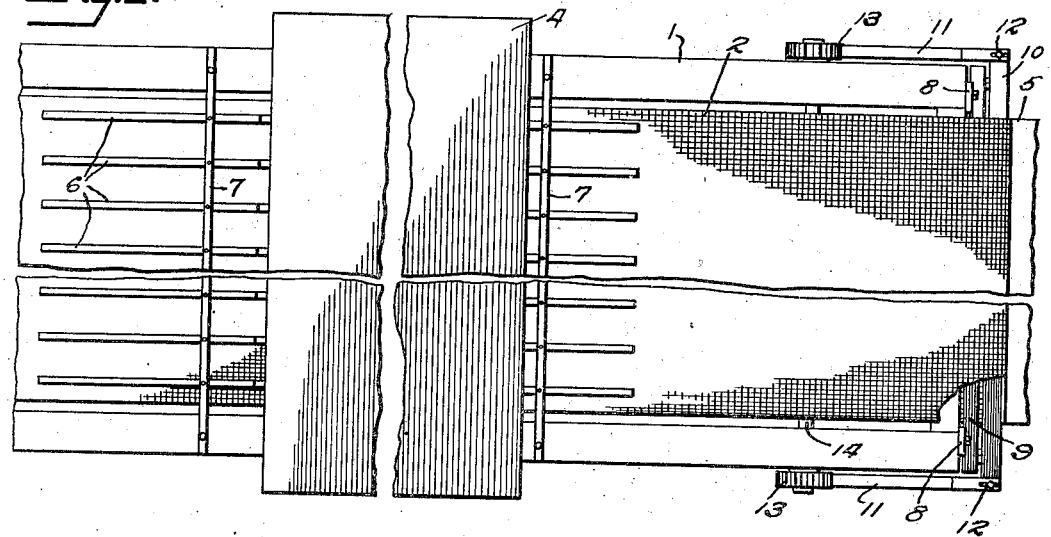
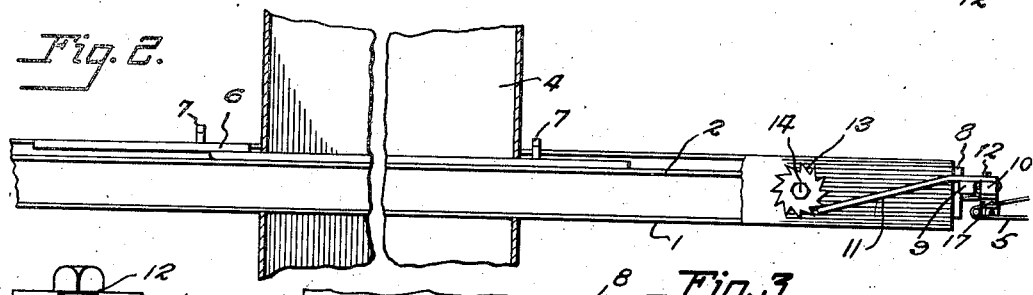
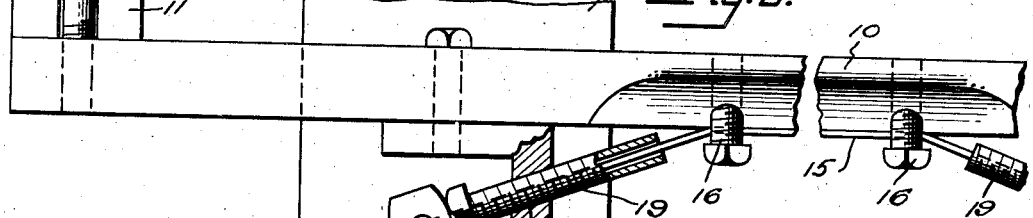
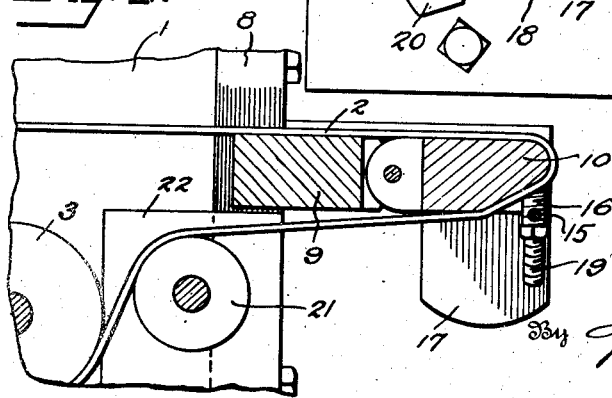
Inventor
*Frank Petrovic*
By *Mason Fenwick & Lawrence*
Attorneys Patented Aug. 27, 1946

2,406,437

UNITED STATES PATENT OFFICE 2,406,437

CHOCOLATE DIPPED PEANUT ATTACHMENT

Frank Petrovic, Chicago, Ill., assignor to E. J. Brach & Sons, Chicago, Ill., a corporation of Illinois Application June 10, 1942, Serial No. 446,517

11 Claims. (Cl. 91—3)

This invention relates to confection-enrobing machines, and more particularly to an attachment for producing chocolate-dipped nuts.

Candy manufacturers have experienced great difficulty with existing machinery in the production of single dipped chocolate-coated nuts, particularly peanuts, in keeping the dipped nuts from rolling together and adhering. Consequently the finished product often contains many clusters of several nuts which, from a merchandising standpoint, is an entirely different product. The enormous size of known chocolate-dipped nut machines precludes their use to all but the larger manufacturers who have great areas of floor space available for their installation.

The object of the present invention is to provide an attachment for any size standard chocolate enrober which can be quickly set up for the production of chocolate-dipped nuts, and easily removed when the enrober is needed for the manufacture of other candies.

The invention also contemplates provision of means to keep the chocolate-coated nuts agitated to prevent their sticking together and forming clusters.

Another object of the invention is to provide means to automatically separate the nuts into orderly rows before they pass through the chocolate-coating compartment of the enrober.

A further object is to provide means for damping the vibration of the conveyor belt before it reaches the driving roll to ensure smooth continuous operation of the belt.

Various other objects of the invention will become apparent from the following detailed description of a preferred embodiment of the invention taken in connection with the accompanying drawing in which:

Figure 1 is a top plan view of a conventional chocolate enrober equipped with the attachment of the present invention;

Figure 2 is a vertical longitudinal section through the enrober, parts being shown in elevation;

Figure 3 is an enlarged partial front view of the attachment removed from the enrober; and Figure 4 is an enlarged fragmentary vertical section through the attachment and part of the enrober.

In the drawing a standard chocolate enrober is shown conventionally, consisting of a frame 1, endless mesh conveyor 2 driven by the driving roll 3, and a chocolate-coating compartment 4. Nuts are dumped, or dropped from a hopper not shown, upon the conveyor 2 whereupon they are drawn through the chocolate-coating compartment 4 and subsequently deposited upon an oil-cloth belt 5 on which they are carried off to be cooled.

To arrange the nuts in orderly fashion upon the mesh conveyor 2, a series of equi-spaced, parallel partitions 6 are employed, extending longitudinally in the direction of travel of the conveyor 2, passing through and projecting beyond the chocolate-coating compartment 4. Partitions 6 are held in spaced relation by cross bars 7 which are removably secured to the frame of the enrober to position the partitions above the conveyor 2. The partitions separate the nuts into controlled rows during their passage through the coating compartment.

At the forward end of the enrober, brackets 8 are fastened to the frame and support a bar 9 which is positioned transversely of the machine just below and supporting the upper flight of the conveyor 2. Hingedly connected to the bar 9 is a floating nose bar 10 about which the conveyor 2 turns. A spring arm 11 is adjustably secured at either end of the nose bar by means of a slotted connection 12, the inner end of the spring arms contacting the teeth of ratchets 13 fixed upon opposite ends of a shaft 14, rotated in any suitable manner from the enrober drive mechanism. The slotted adjustment permits varying the oscillation of the nose bar.

Rotation of the ratchets causes oscillation of the spring arms and nose bar, vibrating the conveyor 2 and agitating the confections to prevent them from sticking together.

Despite the vibration imparted to the conveyor by the nose bar, some of the soft confection may cling to the conveyor as it turns about the nose bar and fail to drop onto the oil-cloth belt 5, and, also, the vibration may cause two of the confections to contact just as they drop from the conveyor. To provide for such instances, a tensioned breaker wire 15 is carried by the nose bar, spaced slightly therefrom by passing through openings in bolts 16 which are threaded into the under-side of the nose bar adjacent the ends of the bars. Angle brackets 17 are bolted beneath the nose bar between the bolts 16 and the ends of the bars, the vertical flanges of the brackets each having a threaded opening 18 to receive a hollow stud bolt 19 through which the ends of the wire 15 pass. A collar 20 is secured to each end of the wire to abut the heads of the stud bolts 19. To tension the wire the collars are slipped along the wire until they contact the heads of the stud bolts and the bolts are then turned to bring the desired pressure against the collars. Although similar adjusting means are shown at both ends of the wire it is merely for convenience as adjustment of one side is sufficient.

The mesh conveyor 2 is driven by means of the driving roll 3 around which it passes, and the vibration of the conveyor would tend to cause imperfect contact between the conveyor and the roll. To correct this a damping roll 21 journalled in lateral extensions of the mounting brackets 8 is provided, which not only stops the vibration of the conveyor before it reaches the driving roll, but by being positioned above the center of the driving roll lifts the conveyor and provides increased length of surface contact between the conveyor and the driving roll.

While in the above one practical embodiment of the inventive concept has been described, many variations within the scope of the appended claims will be obvious to those skilled in the art.

What I claim is:

1. An attachment for confection-enrobing machines of that type in which confection centers are carried through a coating compartment on an endless conveyor belt comprising, a pair of bars hingedly connected, one of said bars being adapted detachably to be secured to the enrobing machine, and the other forming a nose bar around which the conveyor belt will turn, and means to vibrate said nose bar to impart vibration to the conveyor belt.

2. An attachment for confection-enrobing machines of that type in which confection centers are carried through a coating compartment on an endless conveyor belt comprising, a pair of bars hingedly connected, one of said bars being adapted detachably to be secured to the enrobing machine, and the other forming a nose bar around which the conveyor belt turns, an arm connected at one end to said nose bar and a ratchet wheel contacting the other end of said arm whereby rotation of the ratchet wheel imparts vibration to the conveyor belt.

3. Mechanisms for attachment to confection-enrobing machines of that type in which confection centers are carried through a coating compartment on an endless conveyor belt and having a driving roll for said conveyor belt comprising in combination, means above the belt engageable with the centers placed thereon to separate the centers laterally with respect to each other into longitudinally extending rows to prevent laterally adjacent coated centers from sticking to each other after passing through the coating compartment, means below the upper flight of the conveyor belt and engageable with the latter to vibrate the same to separate adjacent coated centers in each row longitudinally with respect to each other to prevent them from sticking together, and means adapted to be located between said vibrating means and the conveyor belt driving roll for damping the vibrations of said conveyor belt to provide a smooth, continuous and unbroken movement of the conveyor belt in spite of the action of the vibration means thereby to maintain separation of adjacent coated centers and prevent clustering thereof.

4. Mechanisms for attachment to confection-enrobing machines of that type in which confection centers are carried through a coating compartment on an endless conveyor belt and having a driving roll for said conveyor belt comprising in combination, means above the belt engageable with the centers placed thereon to separate the centers laterally with respect to each other into longitudinally extending rows to prevent laterally adjacent coated centers from sticking to each other after passing through the coating compartment, a pair of bars hingedly connected, one of said bars being adapted detachably to be secured to the enrobing machine, and the other forming a nose bar around which the conveyor belt will turn, means to vibrate the said nose bar to impart vibration to the conveyor belt, and means adapted to be located between said nose bar and the conveyor belt driving roll for damping the vibrations of said conveyor belt to provide a smooth, continuous and unbroken movement of the conveyor belt in spite of the action of the vibration means thereby to maintain separation of adjacent coated centers and prevent clustering thereof.

5. Mechanisms for attachment to confection-enrobing machines of that type in which confection centers are carried through a coating compartment on an endless conveyor belt and having a driving roll for said conveyor belt comprising in combination, means above the belt engageable with the centers placed thereon to separate the centers laterally with respect to each other into longitudinally extending rows to prevent laterally adjacent coated centers from sticking to each other after passing through the coating compartment, a pair of bars hingedly connected, one of said bars being adapted detachably to be secured to the enrobing machine, and the other forming a nose bar around which the conveyor belt will turn, means to vibrate the said nose bar to impart vibration to the conveyor belt, and a damping roll adapted to be located between said nose bar and the conveyor belt driving roll for damping the vibrations of said conveyor belt to provide a smooth, continuous and unbroken movement of the conveyor belt in spite of the action of the vibration means thereby to maintain separation of adjacent coated centers and prevent clustering thereof.

6. Mechanisms for attachment to confection-enrobing machines of that type in which confection centers are carried through a coating compartment on an endless conveyor belt and having a driving roll for said conveyor belt comprising in combination, means above the belt engageable with the centers placed thereon to separate the centers laterally with respect to each other into longitudinally extending rows to prevent laterally adjacent coated centers from sticking to each other after passing through the coating compartment, a pair of bars hingedly connected, one of said bars being adapted detachably to be secured to the enrobing machine, and the other forming a nose bar around which the conveyor belt will turn, an arm connected at one end to said nose bar and a ratchet wheel contacting the other end of said arm whereby rotation of the ratchet wheel imparts vibration to the conveyor belt, and a damping roll adapted to be located between said nose bar and the conveyor belt driving roll for damping the vibrations of said conveyor belt to provide a smooth, continuous and unbroken movement of the conveyor belt in spite of the action of the vibration means thereby to maintain separation of adjacent coated centers and prevent clustering thereof.

7. Mechanisms for attachment to confection-enrobing machines of that type in which confection centers are carried through a coating compartment on an endless conveyor belt comprising, in combination, a pair of bars hingedly connected, one of said bars being adapted detachably to be secured to the enrobing machine, and the other forming a nose bar around which the conveyor belt will turn, a breaker wire adapted to be spaced from the lower front edge of said nose bar and to be mounted to move with the nose bar, and means to vibrate said nose bar to impart vibration to the conveyor belt.

8. Mechanisms for attachment to confection-enrobing machines of that type in which confection centers are carried through a coating compartment on an endless conveyor belt and having a driving roll for said conveyor belt comprising in combination, means above the belt engageable with the centers placed thereon to separate the centers laterally with respect to each other into longitudinally extending rows to prevent laterally adjacent coated centers from sticking to each other after passing through the coating compartment, a pair of bars hingedly connected, one of said bars being adapted detachably to be secured to the enrobing machine, and the other forming a nose bar around which the conveyor belt will turn, a breaker wire adapted to be spaced from the lower front edge of said nose bar and to be mounted to move with the nose bar, said conveyor belt being adapted to move between said nose bar and the breaker wire, means to adjust the tension of said breaker wire, an arm connected at one end to said nose bar and a ratchet wheel contacting the other end of said arm whereby rotation of the ratchet wheel will impart vibration to the conveyor belt, and a damping roll adapted to be located between said nose bar and the conveyor belt driving roll for damping the vibrations of said conveyor belt to provide a smooth, continuous and unbroken movement of the conveyor belt in spite of the action of the vibration means thereby to maintain separation of adjacent coated centers and prevent clustering thereof.

9. An attachment for confection-enrobing machines of that type in which confection centers are carried through a coating compartment on an endless conveyor belt comprising, a nose bar around which the conveyor belt is adapted to turn, and means automatically to vibrate said nose bar to impart vibration to the conveyor belt.

10. An attachment for confection-enrobing machines of that type in which confection centers are carried through a coating compartment on an endless conveyor belt comprising, a nose bar adapted to be hinged along its rear edge to the enrobing machine around which nose bar the conveyor belt will turn, and means including a member connected to one end of said nose bar adapted automatically to vibrate said nose bar to impart vibration to the conveyor belt.

11. An attachment for confection-enrobing machines of that type in which confection centers are carried through a coating compartment on an endless conveyor belt comprising, a nose bar adapted to be hinged along its rear edge to the enrobing machine around which nose bar the conveyor belt turns, an arm connected at one end to said nose bar and a ratchet wheel contacting the other end of said arm whereby rotation of the ratchet wheel imparts vibration to the conveyor belt.

FRANK PETROVIC.